US009327257B2

(12) United States Patent
Pratas Da Silva et al.

(10) Patent No.: US 9,327,257 B2
(45) Date of Patent: May 3, 2016

(54) CONTINUOUS PROCESS FOR NANOMATERIAL SYNTHESIS FROM SIMULTANEOUS EMULSIFICATION AND DETONATION OF AN EMULSION

(75) Inventors: Sílvio Manuel Pratas Da Silva, Figueira de Lorvão (PT); João Manuel Calado Da Silva, Aljustrel (PT)

(73) Assignee: INNOVNANO—MATERIAIS AVANCADOS, S.A., Aljustrel (PT)

( * ) Notice: Subject to any disclaimer, the term of this patent is extended or adjusted under 35 U.S.C. 154(b) by 291 days.

(21) Appl. No.: 13/880,309

(22) PCT Filed: Oct. 18, 2011

(86) PCT No.: PCT/IB2011/054637
§ 371 (c)(1), (2), (4) Date: Jun. 5, 2013

(87) PCT Pub. No.: WO2012/052923
PCT Pub. Date: Apr. 26, 2012

(65) Prior Publication Data

US 2013/0251623 A1 Sep. 26, 2013

(30) Foreign Application Priority Data

Oct. 18, 2010 (PT) ........................................ 105340

(51) Int. Cl.

| | |
|---|---|
| ***B01J 3/08*** | (2006.01) |
| ***B82Y 30/00*** | (2011.01) |
| ***B82Y 40/00*** | (2011.01) |
| ***C01B 13/32*** | (2006.01) |
| ***C01F 7/16*** | (2006.01) |
| ***C01G 23/047*** | (2006.01) |
| ***C01G 45/12*** | (2006.01) |
| ***C04B 35/01*** | (2006.01) |
| ***C04B 35/443*** | (2006.01) |
| ***C06B 23/00*** | (2006.01) |
| ***C06B 47/14*** | (2006.01) |

(52) U.S. Cl.
CPC .. *B01J 3/08* (2013.01); *B82Y 30/00* (2013.01); *B82Y 40/00* (2013.01); *C01B 13/328* (2013.01); *C01F 7/162* (2013.01); *C01G 23/047* (2013.01); *C01G 45/1242* (2013.01); *C04B 35/016* (2013.01); *C04B 35/443* (2013.01); *C06B 23/00* (2013.01); *C06B 47/145* (2013.01); *C01P 2002/32* (2013.01); *C01P 2004/64* (2013.01); *C01P 2006/12* (2013.01); *C04B 2235/3203* (2013.01); *C04B 2235/3222* (2013.01); *C04B 2235/5454* (2013.01)

(58) Field of Classification Search
CPC ........... B01J 3/08; B82Y 30/00; B82Y 40/00; C01B 13/328; C01F 7/162; C01G 23/047; C01G 45/1242
USPC ........................... 423/599, 600, 610; 428/402
See application file for complete search history.

(56) References Cited

FOREIGN PATENT DOCUMENTS

| | | | |
|---|---|---|---|
| WO | WO2009/144665 | * | 12/2009 |
| WO | WO 2009/144665 | A2 | 12/2009 |
| WO | WO2010/059070 | * | 5/2010 |
| WO | WO 2010/059070 | A1 | 5/2010 |

OTHER PUBLICATIONS

Wang et al. (2007). Nano-$MnFe_2O_4$ powder synthesis by detonation of emulsion explosive. *Applied Physics A*, 90(3), 417-422.

Notification of Transmittal of the International Search Report and the Written Opinion of the International Searching Authority, or the Declaration, including an International Search Report and Written Opinion of the International Searching Authority, mailed Feb. 3, 2012 in connection with PCT International Application No. PCT/IB2011/054637, filed Oct. 18, 2011.

* cited by examiner

*Primary Examiner* — Leszek Kiliman
(74) *Attorney, Agent, or Firm* — John P. White; Cooper & Dunham LLP

(57) ABSTRACT

The present invention refers to a continuous process for in secco nanomaterial synthesis from the emulsification and detonation of an emulsion. The said process combines the simultaneous emulsification and detonation operations of the emulsion, thus assuring a production yield superior to 100 kg/h. When guaranteeing that the sensitization of the emulsion occurs mainly upon its feeding into the reactor, it is possible to avoid the accumulation of any class-1 substances along the entire synthesis process, thus turning it into an intrinsically safe process. Afterwards, dry collection of the nanomaterial avoids the production of liquid effluents, which are very difficult to process. Given that there's neither accumulation nor resort to explosive substances along the respective stages, the process of the present invention becomes a safe way of obtaining nanomaterial, thus allowing it to be implemented in areas wherein processes with hazardous substance aid are not allowed.

15 Claims, No Drawings

CONTINUOUS PROCESS FOR NANOMATERIAL SYNTHESIS FROM SIMULTANEOUS EMULSIFICATION AND DETONATION OF AN EMULSION

CROSS-REFERENCE TO RELATED APPLICATIONS

This application is a §371 national stage of PCT International Application No. PCT/IB2011/054637, filed Oct. 18, 2011, claiming priority of Portuguese Patent Application No. 105340, filed Oct. 18, 2010, the contents of each of which are hereby incorporated by reference in its entirety.

TECHNICAL DOMAIN OF THE INVENTION

The present invention refers to a continuous process for in secco nanomaterial synthesis from the emulsification and detonation of an emulsion in simultaneous stages and at a same production rate. The process of the present invention provides application in obtaining of a vast range of nanomaterial products. The simultaneity of the emulsification and detonation stages contributes to a process reproductiveness having a nanomaterial production yield superior to 100 kg/h.

BACKGROUND OF THE INVENTION

Nanomaterials inferior to 100 nm are constituent blocks of a new and recently emerging subject area, designated nanotechnology. In fact, an enormous interest all over the world is now observed towards the "very small". From scientific areas to politics itself, nanotechnology is also frequently present in main world leaders' speeches. It is presented as holding the potential of providing a technological discontinuity with as relevant positive implications in citizen life as past historical events, such as the discovery of steam machines, the train, the automobile, the computer and biotechnology. Such enthusiasm is a result of particles or structures, such as films, pores or nanometric surfaces within a given material, presenting a group of electrical, optical, magnetic and mechanical properties, which are different from those of the same material having superior dimensions. In particular, we refer to properties such as high plasticity, super hardness, lower melting point, transparency and high surface area per mass unit with a consequent improvement in catalytic activity, low thermal conductivity, an increase on the magnetic effect, high semiconductor luminescence, color alterations, and inclusively quantum mechanics laws compliance. Some scientists inclusively propose a theory on the probable state of matter.

In recent years, and as a result of the knowledge on these new properties, a thorough investigation has been observed towards the development of new nanomaterial production methods which comply with two fundamental requirements: i) production yield at an industrial scale (ton/day); ii) reproducibility of nanomaterial properties, essential conditions to support the large scale incorporation of the nanomaterial thus produced, either creating new products or improving the functionalities of those already existing in multiple cross applications such as energy, environment, building constructing, automobile, chemistry, optics, electronics and medicine technical fields.

The known nanomaterial synthesis methods, and which are thoroughly referred to in the literature, are framed within three major categories:

I—Liquid-Phase Methods

This category comprises a group of methods already established or yet in industrialization imminence, namely: a) sol-gel, b) co-precipitation and c) hydrothermal and electrochemical synthesis. These have as common principle a starting material in solution or gel form, wherein precursors are either dissolved to a molecular scale or dispersed in the desired stoichiometric proportion. In a following stage, these precursors are decomposed in controlled manner, a precipitate being formed, usually as an hydroxide, which requires several subsequent treatment stages, such as calcination, for its conversion into an oxide with the desired crystalline structure, being followed by a final breakdown by grinding process.

The major drawback/limitation in these liquid-phase methods are the low production rates (g/h), as well as the high liquid/solvent amounts, which must be later removed or eliminated so as to maintain the nanoparticles in low aggregation. In this removal process, the solvent must be carefully and meticulously separated from the nanoparticles, thus implying compulsory recycling and treatment systems for liquid effluents, which consume plenty of energy and require complex equipments of time consuming operation.

II—Solid-Phase Methods

In this category, nanoparticles are usually prepared from a first slow reaction in the solid state among different precursors, such as carbonates, oxides etc. It is also designated "mechanosynthesis", wherein the reaction activation energy is supplied by a mill, being followed by an intensive grinding process until particles inferior to 200 nm are obtained. The main limitations in this low-cost method, besides the difficulties observed in obtaining dimensions inferior to 0.2 microns, are related to the presence of impurities, with a non-homogeneous particle-size distribution and essentially at a deficient homogeneity degree, specially when it comes to synthesizing composites and ternary structures or superior structures, originated by incomplete diffusion reactions among reagents, this last limitation having strong consequences in synthesized nanomaterial reproducibility.

III—Gaseous-Phase Methods

These methods comprise processes for both the production of individual nanoparticles and for direct application in surface coating, namely a) combustion synthesis, b) spray pyrolysis, c) evaporation/oxidation of metals, plasma, CVD, PVD, laser deposition, etc.

Generally, there are three production stages:

a) Precursor conversion into vapor, with the formation of an aerosol;

b) Condensation as nanoparticles (with heat release), subsequently to the precursor's oxidation reaction;

c) Control and preservation of nanomaterial dispersion state.

Once it is a "bottom-to-top" approach, the higher the oversaturation state becomes, the smaller the first thermodynamically-stable particles in condensed form (stage b) will be. This oversaturation state is favored by very high pressures or low temperatures (in case of fog formation). On the other hand, in order to avoid undesirable coagulation/coalescence phenomena, which lead to an extremely prompt growth of the particles (stage c), it is necessary to produce extremely dispersed aerosols, which translates into extraordinarily reduced production rates (g/h). The other two alternatives, such as immediate cooling, after nanoparticle condensation or the use of high-speed gas flows and turbulence, have so far demonstrated to be of difficult industrial implementation.

The emulsion detonation is a singular method in nanomaterial synthesis, usually in gaseous phase, containing some highly interesting characteristics which allow overcoming some of the limitations inherent to gaseous-phase synthesis:

a) Extremely high pressures, that might go up to 10 GPa (100,000 bar), turning the first structure of stable condensed matter into very small dimension;

b) Extremely fast cooling, due to the speed of adiabatic expansion of the gases resulting from the reaction;

c) Gas flow with high-speed expansion and turbulence.

These reasons have led to an interest towards the use of the emulsion detonation concept as nanomaterial synthesis method, usually in gaseous phase, a set of recent documents being referenced, which however disclose some weak points as far as class-1 matter use, such as explosives and/or detonators are concerned, which represent a high risk in discontinuous production operations:

EP1577265, "Production of fine powder of aluminium oxide" discloses an industrial process for the production of micrometrical alumina from a cyclic detonation method of mixed granulated aluminum with an oxidizer, the later possibly being an emulsion (w/o). It is a method limited to the obtaining of alumina of micrometrical dimension, and depicts mainly the use of metals as precursors. Previous preparation of class-1 material (explosive) is used, and consequently, a discontinuous process, as well as wet collection associated to extremely complex effluent treatment.

WO2009040770 "Nanocrystalline spherical ceramic oxides, process for the synthesis and uses thereof" discloses a synthesis process for spherical micrometrical particles, with nanocrystalline structure, from the detonation of an emulsions (w/o) at a detonation temperature superior to the melting point of the oxides thus formed, allowing these to assume a spherical form. It is a discontinuous synthesis method in gaseous phase that requires the previous preparation of class-1 emulsions (explosives).

WO2009144665 "Nanometric-sized ceramic materials, process for their synthesis and uses thereof" discloses a method for nanomaterial synthesis, such as binary, ternary and higher oxides, nitrates and carbonates, from an emulsion (w/o) detonation at low temperatures (inferior to 2000° C.), with dissolution of soluble metallic precursors in oxidizing phase (internal), from the addition of soluble propellants to the external phase or addition of metals or metal alloys, after emulsion formation. It is also a discontinuous synthesis method in gaseous phase, also requiring the previous preparation of class-1 emulsions (explosives).

Xiao Hong Wang et al. (Nano-MnFe2O4 powder synthesis by detonation of emulsion explosive. Applied Physics A: Materials Science & Processing. Vol. 90, no. 3, March 2008) discloses nanoparticle synthesis of a ferrite (MnFe2O4) from the detonation of an emulsion (w/o) ignited by a military explosive (RDX), wherein the precursors (iron nitrates and manganese, respectively) were previously dissolved in the internal phase. It is a discontinuous synthesis method in gaseous phase that requires the use of explosive material (class 1), such as RDX and detonators. Xinghua Xie et al. (Detonation synthesis of zinc oxide nanometer powders. Materials Letters, Vol. 60, issues 25-26, November 2006. Pp 3149-3152) discloses a process for obtaining ZnO and $Li_2O$ nanoparticles from the detonation of an emulsion, in which lithium and zinc nitrates were dissolved in the internal phase. This emulsion is later ignited by a no. 8 detonator, placed inside a military explosive (RDX). It is a discontinuous synthesis method in gaseous phase, which also resorts to the use of explosive material (class 1), as RDX and detonators, as per in the previous documents.

The process of the present invention is suitable in the category of emulsion detonation and aims at overcoming the limitations above-mentioned and currently inherent to the current methods, namely:

1) Use and/or accumulation of class-1 matter;

2) Procedural discontinuity, usually the composition meant for detonation, after having been prepared and sensitized is manually disposed into a detonation chamber, the ignition being remotely actuated by means of a detonator.

For such purpose, the process of the present invention is aided by a set of technologies, such as:

- Sensitization of the emulsion (transformation into class-1 matter) only at the later stage of reactor feeding;
- Detonation ignition without detonators or any class-1 matter;
- Simultaneous and continuous combination of emulsification and detonation operations of the emulsion.

As a result, the process of the present invention provides a nanomaterial production yield superior to 100 kg/h, with high reproducibility in an automatic process and with increased safety, once it avoids the use or accumulation of any explosive substances along the whole synthesis process. Nanomaterial collection is carried out in secco, thus avoiding all problems associated to liquid effluent toxicity.

GENERAL DESCRIPTION OF THE INVENTION

The present invention refers to a continuous process for in secco nanomaterial synthesis. This process combines a set of technologies so that the emulsification, sensitization, pre-forming, ignition and detonation operations of the emulsion occur simultaneously and continuously, thus allowing nanomaterial production rates superior to 100 Kg/h. By assuring that the emulsion sensitization stage occurs only upon its feeding into the reactor, the accumulation of any explosive substances along the whole synthesis process is thus avoided.

In short, the process according to the present invention aims at achieving the following objectives:

- Industrial processing of nanomaterial synthesis in automatic, continuous and simultaneous operation at production rates superior to 100 kg/h;
- Non-accumulation of any class-1 matter (explosives);
- No production of liquid effluents.

In order to guaranty that the nanomaterial synthesis process complies with the three referred objectives, the combination of a set of technologies essentially associated to the preparation, emulsification, sensitization and ignition of the emulsions, as well as to the nanomaterial in secco collection and processing becomes a requisite.

The base emulsion referred to in the present invention is of the water in oil (w/o) type, being formed in two phases intimately connected under the effect of a surfactant:

a) Internal phase, oxygen-rich;

b) External phase, propellant, based on organic components.

The precursors of the nanomaterial meant to synthesize may include a wide range of compounds, as long as they comply with the criterion for chemical and physical compatibility with the emulsion. Furthermore, they can be fed either in internal phase or external phase of the emulsion or after the emulsification stage.

In general terms, the method herein proposed comprises a set of stages:

a) Preparation of the internal and external phases of the emulsions, in desired amounts for the intended production;

b) Emulsification of both phases, under the effect of mechanical energy;

c) Sensitization of the emulsion;

d) Pre-forming into the desired geometry for the composition;

e) Feeding into the reactor;

f) Ignition of the emulsion;

g) Detonation of the emulsion;

h) Collection of the nanomaterial.

Wherein sensitization, pre-forming, feeding into the reactor, emulsion ignition and detonation (c; d; e; f; g) take place simultaneously.

The key aspects for accomplishing the present invention are the following:

The desired amounts of internal and external phases are previously prepared, being followed by the emulsification of both phases which occurs continuously;

The emulsification, Pre-forming and sensitization stages occur continuously;

The feeding into the reactor, ignition and detonation stages elapse simultaneously with the previous stages and at an identical overall pace, so as to avoid any accumulation of material;

The emulsion sensitization takes place only upon pre-forming and subsequent feeding of the composition into the reactor. The emulsion sensitization is usually carried out by adjusting its final density, by adding a group of substances which feed and disperse a great number of microspheres thereinto. Such feeding may occur by direct injection and homogenization of a gas by chemical reaction, or by adding solid particles which retain the gas in its interior.

These microspheres, when adiabatically compressed under mechanical energy or external pulse, form a group of "hot points" achieving about 400-600° C. within them. This stage is carried out in a significant short time, among $10^{-3}$ to $10^{-5}$ s, unchaining and supporting the detonation progress along the emulsion.

One of the most relevant aspects of the process of the present invention is that the emulsion changes from a 5.1-classification oxidizing matter into an explosive class-1 matter, and which provides it with the capability to detonate under shock effect, occurs continuously and mainly whilst its pre-forming and subsequent feeding into the reactor. Therefore, the accumulation of class-1 matter is avoided along the synthesis process, thus resulting in an extremely safe method.

In the present invention, the sensitization is preferentially carried out by injecting and homogenizing an inert gas, such as air or carbon dioxide, inside the emulsion by mechanical means.

The ignition of the emulsion inside the reactor, according to the present invention should not resort to any class-1 substance, such as detonators.

So being, the detonation ignition in the process of the present invention may be unchained by laser or capacitive discharge with condenser battery. Depending on the sensitivity of the emulsion composition, it might be directly ignited or ignited by another non-contaminating and more sensitive emulsion, which might provide the necessary shock energy to detonate the emulsion of the present invention. In a preferred embodiment of the present invention, the detonation ignition in the synthesis emulsion is accomplished by means of an ignition emulsion.

The in secco material collection benefits from the intermission between detonations, wherein the nanomaterial suspension in gas is made to circulate in closed loop between the expansion chamber and the cyclone separator, preferably a high-efficiency cyclone separator, namely with efficiency superior to 95%. This embodiment allows more than ten passages trough the cyclone separator (before a new detonation cycle) and therefore achieves a final recovery superior to 99.5%. The recovery rate per passage is of about 65%.

1. Preparation of Internal and External Phases of the Emulsion

Both phases should be previously prepared in necessary amounts prior to the continuous production process.

1.1 Internal Phase

The internal phase of the emulsion is prepared from ammonium nitrate dissolved in demineralized water, wherein soluble oxidizers, soluble propellants or insoluble precursors are also incorporated in this phase, should they have been selected. The mixture is heated up to 85-105° C., so as to allow the complete dissolution of the soluble precursors. Nitrate, chloride, sulfate, and acetate dissolution usually derives in significantly low pH values, in the range between 0-4, meaning that containers consisting of resistant material, such as metal alloys in stainless steel, are necessary.

1.2 External Phase

The external phase is the one responsible for determining the general physical and chemical characteristics of the emulsion, as well as its consistency and final rheological features, its appropriate selection and preparation being therefore equally important:

a) The emulsion should be preferentially detonated inside the reactor, without a housing, so as to avoid that the pyrolysis thereof results in the presence of contaminant substances in the final nanomaterial. Should a housing be used, it should be composed of an organic material such as polyethylene (PE) or polypropylene (PP), exempt from any inorganic additives susceptible of contaminating the final product. For such purpose, the final rheology of the emulsion should present a significantly high consistency, with a viscosity superior to 200 Pa·s assuring the composition support and necessary self-confinement so as to guarantee a stable detonation;

b) On the other hand, the emulsified composition should have a relatively low viscosity/consistency during the first stages of the process, so as to guarantee its simple processing—emulsification, pumping, air injection, etc.;

c) Additionally, it must be formed in different geometries, such as cylindrical, planar, or spherical.

In order to accomplish these opposing requirements, the external phase of the emulsion is based on hydrocarbon derivatives, for example waxes such as paraffinic or microcrystalline waxes or mixtures of waxes with polymers, which, upon heating and liquefaction, have extremely low viscosity indexes between 0.004 and 0.020 Pa·s at 40° C., thus assuring a simple formation of the emulsion and processing thereof, and which upon sudden cooling change into the solid state, thus providing high consistency to the emulsion, which is an important requirement for the feeding and detonation stage inside the reactor, in the case where precursors as miscible propellants have been selected for the external phase, which should be incorporated at this step.

2. Emulsification

A water in oil (w/o) matrix emulsion is prepared from the emulsification obtained in the two phases under mechanical energy effect in a static mixer equipment, a jet mixer, colloid mill, recycle mixer, etc; the internal phase is aqueous and oxygen-rich, whereas the external phase is propellant consisting of a mixture of paraffinic waxes with mineral oils, to which a surfactant was previously added, which enables a decrease on surface tension among both phases.

3. Pre-Forming

In the Pre-forming stage, the emulsion is pumped into a mold by a diaphragm pump, the mold having a spherical, cylindrical or planar shape and the intended dimensions for the composition meant to be detonated.

4. Sensitization of the Emulsion

When entering into the mold, a certain volume of air is injected into the emulsion, according to the intended final density, which is usually inferior to 1.25 g/cm$^3$. The subsequent homogenization of the air inside the emulsion structure is assured by passing the air/emulsion mixture through a static mixer.

5. Cooling

The emulsion inside the mold is cooled under the effect of cold water flowing inside an external sleeve around the mold, until a temperature inferior to the wax melting point forming its external phase is achieved, thus providing it with the rheology and necessary stringency to obtain the desired characteristics. Inside the mold, the ignition plate or optical fiber are also arranged, depending on the ignition method selected: laser or capacitive discharge.

6. Reactor Feeding

The emulsion having the adequate shape and rheology to the intended purpose, together with the ignition system, is fed into the reactor.

7. Ignition/Detonation

The detonation is ignited and the resulting shockwave converts the precursors into the intended nanomaterial.

8. Collection of the Nanomaterial

The resulting gases from the detonation are expanded into a bulk chamber (superior to 20 m$^3$), where the suspended nanoparticles circulate in closed loop between the expansion chamber and the high-efficient cyclone separator, in intermissions between detonations. This embodiment allows more than ten passages trough the cyclone separator (before a new detonation cycle) and therefore achieving a final recovery superior to 99.5%. The recovery rate per passage is of about 65%.

9. Operation

The present invention may be carried out with several connection configurations between the process stages, wherein independently from the configuration selected, the sensitization and detonation are mandatorily-cyclical stages so as to avoid the accumulation of any class-1 material (explosives). So being, independently from the selected configuration, the sensitized emulsion is promptly detonated prior to a new sensitization cycle (air injection into the emulsion), the following operation configurations being possible:

a) Emulsification in continuous operation: the emulsification stage elapses at an identical pace to that of the final sensitization/detonation cycle. From the previous preparation of the internal (oxidizer) and external (propellant) phases of the emulsion (Figure 1). Although implicating high complexity in terms of process control, all operations elapse at the same pace and in stationary state, without any accumulation of intermediate matter;

b) Emulsification in discontinuous operation: in this configuration, the emulsification stage takes place per batch, an intended amount of emulsion matrix (Figure 2) being produced in each batch, the emulsion not yet being sensitized (class 5.1). Afterwards, the Pre-forming and sensitization stages take place continuously, and the remaining stages take place cyclically, until the amount of matrix emulsion is used up. With the preparation of a new "batch" matrix emulsion, the process is restarted. This configuration implies the intermediate production and accumulation of a class-5.1 emulsion matrix, but on the other hand, it is less demanding in terms of the complexity of the control system, thus providing a sturdier reproducibility of the synthesis process.

The nanomaterial collection is similar in both configurations, that is, by means of consecutively passing the nanoparticles suspension through a high-efficiency cyclone separator between detonations.

10. Nanomaterial

The process of the present invention allows obtaining nanomaterial with single (one element), binary (two elements), ternary (three elements) structures or higher, as well as composites (combinations of two or more different nanomaterials), with surface areas superior to 10 m$^2$/g and consisting of primary particles between 5-80 nm. These properties are obtained from the shockwave along the emulsion, whose effect actuates the following mechanisms, almost simultaneously:

a) Decomposition and fragmentation of the precursors;

b) Reaction among several chemical species, in order to form the intended final composition;

c) Expansion and prompt cooling at about 100,000 Kelvin/s of the final composition, thus minimizing the coalescence/coagulation phenomena.

DETAILED DESCRIPTION OF THE INVENTION

1. Preparation of the Emulsions 1.1 Preparation of the Internal Phase of the Emulsion 1.1.1 Depending on the compatibility criterion among precursors and water, the ammonium nitrate is:

a) Dissolved, in case of precursors compatible with water, either soluble or insoluble, such as carbonates, oxides and hydroxides, in demineralized water, at a concentration about 80-90% and heated until a temperature between 95-105° C. superior to the crystallization temperature of the mixture is achieved, so as to form a fully transparent solution exempt from visible crystals;

b) Liquefied, in the case of precursors incompatible with water, after being mixed with a compound reducing its melting point, being followed by slow and gradual steam heating circulating in a heating sleeve, until a temperature of 110° C. and the liquid state are achieved.

1.1.2 Continuously, the selected precursors are added to the ammonium nitrate in aqueous solution or liquefied, in stoichiometric proportions according to the crystalline structure intended for the nanomaterial meant to be synthesized, the mixtures being held under stirring so as to guarantee their homogeneity.

1.2. Preparation of the External Phase of the Emulsion

The external phase or propellant is prepared by previous melting a paraffinic wax having a melting point between 40-70° C., and later mixing it with mineral oil and an emulsifying agent, with a hydrophile/lipophil (HLB) ratio suitable for the formation of the water in oil emulsion (w/o). The external phase generally represents about 2-30% of the emulsion composition.

2. Emulsification

The emulsification of both phases, in an emulsified matrix, pertaining to the oxidizing class 5.1, may take place on either continuous or discontinuous basis, using any of the known emulsification technologies. Later, the matrix is refined at about 60-150 psi, so as to obtain an emulsion, with a micelle size from 0.5 to 10 microns which provides the required stability.

3. Pre-Forming

Afterwards, the emulsion is pumped into a mold by a diaphragm bomb, the mold having spherical, cylindrical, or planar shape, and the dimensions intended for the composition meant to detonation.

4. Emulsion Sensitization

When entering into the mold, a certain volume of air is injected into the emulsion, according to the intended final density, which is usually inferior to 1.25 g/cm$^3$. The subsequent homogenization of the air inside the emulsion structure is assured by passing the air/emulsion mixture through a static mixer.

5. Cooling

The emulsion inside the mold is cooled under the effect of cold water flowing inside an external sleeve around the mold, until a temperature inferior to the wax melting point forming its external phase is achieved, thus providing it with the rheology and necessary stringency to obtain the desired characteristics. Inside the mold, the ignition plate or optical fiber are also arranged, depending on the ignition method selected: laser or capacitive discharge.

6. Reactor Feeding

The emulsion having the adequate shape and rheology to the intended purpose, together with the ignition system, is subsequently fed into the reactor.

7. Ignition/Detonation

The detonation is ignited and the resulting shockwave converts the precursors into the intended nanomaterial.

8. Collection of the Nanomaterial

The resulting gases from the detonation are expanded into a bulk chamber (superior to 20 m$^3$), where the suspended nanoparticles are exhausted and collected within a highly efficient cyclone separator, subsequently to consecutive circulation between detonations.

9. Characterization of the Nanomaterial

The nanomaterial obtained by the present method is characterized by:

a) Multiple crystalline structures:
   Binary, such as: cubic, hexagonal, Fluorite, Rutile, etc;
   Ternary, such as: spinel, Perovskite, calcite, olivine, etc;
   Superior, such as: Garnet, Pseudo Brookite, etc.
b) Primary Particles between 5 and 70 nm.
c) Surface areas between 10 and 500 m$^2$/g.

EXAMPLES

For a clearer understanding of the present invention, examples are herein attached which represent preferred embodiments of the invention but which do not intend to limit the scope of the present invention.

Example 1

Synthesis of Nanometric Magnesium Aluminate Spinel ($MgAl_2O_4$)

1. Preparation of the Internal Phase of the Emulsion

Solid ammonium nitrate (99.9% purity) is dissolved in demineralized water at a 85% concentration, in a stainless steel tank heated with steam, the mixture being stirred at a temperature of about 98° C. The pH value of the solution is adjusted with ammonium carbonate up to a value between 5 and 6. The soluble aluminum nitrate 38% and magnesium nitrate 13% precursors are added, the heating with steam being maintained until the solution is restored to 98° C. The preparation of the internal phase will then be complete.

2. Preparation of the External Phase of the Emulsion

The preparation of the external phase of the emulsion is based on a paraffinic wax representing 70% in weight of the external phase, and having a melting point at 56° C. It is firstly subject to heating at a temperature up to 65° C., a PIBSA-based emulsifying agent (Polyisobutylene Succinic Anhydride) being added, which represents about 30% in weight of the total external phase. The mixture remains under heating in another stainless steel tank at 75° C., thus allowing it to remain in the liquid state, without however degrading the emulsifying molecule.

3. Production—Emulsification/Detonation

The two phases previously described are continuously fed with 9.4 kg/min (internal phase) and 0.6 kg/min (external phase) flowrates, being continuously mixed and emulsified in a mixer, such as a blade mixer at a 10 kg/min rate. The emulsion matrix thus obtained is simultaneously pumped, with an identical flowrate to that of the emulsification (10 kg/min), by means of a diaphragm pump at about a 4 bar pressure, into a cylindrical stainless steel mold having a 45 mm diameter and being 400 mm long. At the end of the feeding piping to the mold air is injected at 4.2 bar, having 2.4 g/min flowrate, which will adjust the end density of the emulsion into 1.10 g/cm$^3$. The homogenization of the air present in the emulsion is assured by passing the emulsion/air mixture through a static mixer.

The mold is provided with an external sleeve wherein cold water circulates at a temperature of 2° C., and at a speed of 4 m/s, thus assuring heat transfer and subsequent cooling down to about 30° C. and a solidification of the continuous phase of the emulsion, the desired consistency being achieved during the feeding into the mold.

Afterwards, a robot—mechanical/feeder places a metal bridge onto the base of the composition and feeds the set into the reactor at a frequency of 20 cycles/min. Each cycle is complete upon reactor closing and capacitive discharge of about 10 KV, which actuates the detonation reaction.

After expanding the gases inside the 20 m$^3$ cisterns, the inlet valve to the cyclone separator is opened and the nanometric magnesium aluminate spinel is collected, a new feeding cycle into the reactor being promptly restarted.

Table I shows a summary of the procedural parameters and the nanometric magnesium aluminate spinel properties.

Example 2

Synthesis of Nanometric $LiMn_2O_4$ Spinel with Precursors Applied in the Internal Phase of the Emulsion 1. Preparation of the Internal Phase of the Emulsion Solid ammonium nitrate (99.9% purity) is dissolved in demineralized water at a 85% concentration, in a stainless steel tank heated with steam, the mixture being stirred at a temperature of about 98° C. The pH value of the solution is adjusted with ammonium carbonate up to a value between 5 and 6. Manganese carbonate 17.3% and lithium carbonate 2.77% are added, the heating with steam being maintained until the solution is restored to 98° C. The preparation of the internal phase will then be complete.

The external phase of the emulsion is prepared as in Example 1.

The two phases are continuously fed with 9.4 kg/min (internal phase) and 0.6 kg/min (external phase) flowrates, being continuously mixed and emulsified in a mixer, such as a blade mixer at a 10 kg/min rate. The emulsion matrix thus obtained is simultaneously pumped, with an identical flowrate to that of the emulsification (10 kg/min), with the aid of a diaphragm pump at about 4 bar pressure, into a cylindrical stainless steel mold having a 45 mm diameter and being 400 mm long. At the end of the feeding piping into the mold, air is injected at 4.2 bar, having a 2.4 g/min flowrate, which will adjust the end density of the emulsion into 1.15 g/cm$^3$. The homogenization of the air present in the emulsion is assured by passing the emulsion/air mixture through a static mixer.

The mold is provided with an external sleeve wherein cold water circulates at a temperature of 2° C., and at a speed of 4 m/s, thus assuring heat transfer and subsequent cooling down and a solidification of the continuous phase of the emulsion to about 30° C., the desired consistency being achieved during the feeding into the mold. Afterwards, a robot—mechanical/feeder places a metal bridge onto the base of the composition and feeds the set into the reactor at a frequency of 20 cycles/min. Each cycle is complete upon reactor closing and capacitive discharge of about 10 KV, which actuates the detonation reaction. After expanding the gases inside the 20 $m^3$ cisterns, the inlet valve to the cyclone separators is opened and the nanometric Lithium spinel is collected, a new feeding cycle into the reactor being promptly restarted.

Table I shows a summary of the procedural parameters and the nanometric Lithium/manganese oxide spinel properties.

Example 3

Synthesis of $TiO_2$ from the Detonation of a Water-Free Matrix

1. Preparation of the Internal Phase of the Emulsion

A 80% solid ammonium nitrate (99.9% purity) and 10% urea (99.9% purity) mixture is heated with steam in a stainless steel tank at about 110° C., the mixture being held under stirring. Titanium isopropoxide (20%) in liquid state it finally added and the preparation of the internal phase is complete.

2. Preparation of the External Phase of the Emulsion

The external phase is prepared as in examples 1 and 2.

3. Production—Emulsification/Detonation

The two phases are continuously fed with 9.4 kg/min (internal phase) and 0.6 kg/min (external phase) flowrates, being continuously mixed and emulsified in a mixer, such as a blade mixer, at a 10 kg/min rate. The emulsion matrix thus obtained is simultaneously pumped, with an identical flowrate to that of the emulsification (10 kg/min), with the aid of a diaphragm pump at about 4 bar pressure, into a cylindrical stainless steel mold having a 45 mm diameter and being 400 mm long. At the end of the feeding piping into the mold, air is injected at 4.2 bar, having a 2.4 g/min flowrate, which will adjust the end density of the emulsion into 1.10 g/$cm^3$. The homogenization of the air present in the emulsion is assured by passing the emulsion/air mixture through a static mixer.

The mold is provided with an external sleeve wherein cold water circulates at a temperature of 2° C., and at a speed of 4 m/s, thus assuring heat transfer and subsequent cooling down and a solidification of the continuous phase of the emulsion to about 30° C., the desired consistency being achieved during the feeding into the mold. Afterwards, a robot—mechanical/feeder places a metal bridge onto the base of the composition and feeds the set into the reactor at a frequency of 20 cycles/min.

Each cycle is complete upon reactor closing and capacitive discharge of about 10 KV, which actuates the detonation reaction. After expanding the gases inside the 20 $m^3$ cisterns, the inlet valve to the cyclone separators is opened and the $TiO_2$ is collected, a new feeding cycle into the reactor being promptly restarted.

Table I shows a summary of the procedural parameters and the nanometric $TiO_2$ properties.

TABLE I

| Results from the three Examples | | | |
|---|---|---|---|
| Parameters | Example 1 | Example 2 | Example 3 |
| Flowrate Internal phase (kg/min) | 9.4 | 9.4 | 9.4 |
| Flowrate External phase (kg/min) | 0.6 | 0.6 | 0.6 |
| Emulsification rate (kg/min) | 10 | 10 | 10 |
| Viscosity Pre-mixture (Pa · s) | 60 | 70 | 90 |
| Temperature Pre-mixture (° C.) | 85° C. | 85° C. | 95° C. |
| Air Flowrate(g/min) | 2.4 | 2.4 | 2.4 |
| Density of sensitized emulsion (g/$cm^3$) | 1.10 | 1.15 | 1.10 |
| Production rate (kg nanomaterial/h) | 120 | 90 | 40 |
| Particle size (TEM) | 15 nm | 70 nm | 20 nm |
| Crystalline phases | $ZrO_2$ (cubical) 100% | $LiMn_2O_4$ 100% | Anatase 65% Rutile 35% |
| BET ($m^2$/g) | 35 | 18 | 65 |

The three examples herein presented show, for different precursor families, preferential embodiments of the invention, namely the cyclical and continuous character of the synthesis process. Furthermore, they demonstrate the sensitization of the detonation emulsion mainly upon its feeding into the reactor and consequently the absence of class-1 materials, as well as nanomaterial in secco collecting between detonations.

The following claims set out further preferred embodiments of the present invention.

The invention claimed is:

1. A continuous process for nanomaterial synthesis from detonation of at least one emulsion, comprising the following steps:

a) preparation of an internal phase and an external phase of the at least one emulsion, in desired amounts for an intended production;

b) emulsification of the internal and external phases to form the at least one emulsion, under an effect of mechanical energy;

c) sensitization of the at least one emulsion;

d) pre-forming the at least one emulsion into a desired geometry for composition;

e) feeding the at least one emulsion into a reactor;

f) ignition of the at least one emulsion;

g) detonation of the at least one emulsion to synthesize the nanomaterial;

h) collection of the nanomaterial;

wherein the sensitization (c), pre-forming (d), feeding (e), ignition (f) and detonation (g) steps take place simultaneously.

2. A process according to claim 1, wherein the at least one emulsion comprises ammonium nitrate and nanomaterial precursors selected from a group comprising: soluble oxidizers, soluble propellants or insoluble precursors and mixtures thereof in the internal phase; and/or hydrocarbon derivatives and propellant precursors or mixtures thereof miscible in the external phase, or metals, or mixtures thereof.

3. A process according to claim 1, wherein the nanomaterial precursors may be introduced either into the internal phase or external, phase or subsequently into the emulsification step.

4. A process according to claim 1, wherein a total amount of the nanomaterial precursors is less than 70% by weight of the at least one emulsion.

5. A process according to claim 1, wherein the nanomaterial precursors are selected from a group comprising carbonates, oxides, hydroxides, and mixtures thereof.

6. A process according to claim 1, wherein the at least one emulsion comprises ammonium nitrate dissolved in water.

7. A process according to claim 2, wherein hydrocarbon derivatives in the external, phase are selected from a group comprising: waxes, liquid hydrocarbons, oils, and mixtures thereof.

8. A process according to claim 7, wherein the hydrocarbon derivatives have a viscosity index from 0.004 to 0.020 Pa·s, when liquefied.

9. A process according to claim 1, wherein the external phase further includes a surfactant compound.

10. A process according to claim 1, wherein the emulsification is carried out in discontinuous operation.

11. A process according to claim 1, wherein said sensitization step is carried out by injecting and homogenizing an inert gas within the at least one emulsion, or by means of a chemical reaction or by adding solid particles which retain the gas therein.

12. A process according to claim 1, wherein the detonation step is carried out by capacitive discharge or laser.

13. A process according to claim 12, wherein the detonation step further comprises the addition of an ignition emulsion.

14. A process according to claim 1, wherein the collection step is carried out in secco.

15. A process according to claim 1, wherein the collection step is carried out within a cyclone battery.

* * * * *